(12) United States Patent (10) Patent No.: US 8,007,210 B2
Veres (45) Date of Patent: Aug. 30, 2011

(54) SYSTEM AND METHOD FOR BREAKING CHIPS FORMED BY A DRILLING OPERATION

(75) Inventor: Richard Veres, Whittier, CA (US)

(73) Assignee: P. V. Tools, Inc., Santa Fe Springs, CA (US)

( * ) Notice: Subject to any disclaimer, the term of this patent is extended or adjusted under 35 U.S.C. 154(b) by 977 days.

(21) Appl. No.: 11/925,688

(22) Filed: Oct. 26, 2007

(65) Prior Publication Data

US 2009/0110496 A1   Apr. 30, 2009

(51) Int. Cl.
*B23B 47/18* (2006.01)
(52) U.S. Cl. .................. 408/17; 408/138; 408/141
(58) Field of Classification Search .......... 408/141, 408/138, 17
See application file for complete search history.

(56) References Cited

U.S. PATENT DOCUMENTS

| | | | |
|---|---|---|---|
| 2,328,542 A | | 9/1943 | Bates |
| 2,430,019 A | | 11/1947 | Jenkins |
| 2,458,929 A | | 1/1949 | Carleton |
| 2,514,758 A | * | 7/1950 | Hallden ............ 74/22 R |
| 2,515,539 A | * | 7/1950 | Wichman .......... 74/22 R |
| 2,630,723 A | | 3/1953 | Gridley |
| 2,768,830 A | | 10/1956 | Janson |
| 2,869,402 A | * | 1/1959 | Bunnell ............ 74/22 R |
| 3,018,674 A | * | 1/1962 | Kohler ............. 74/22 R |
| 3,767,313 A | * | 10/1973 | Bohoroquez et al. ..... 408/14 |
| 4,362,444 A | | 12/1982 | Watkins |
| RE31,627 E | | 7/1984 | Evans |
| 4,507,030 A | | 3/1985 | Jackson |
| 4,854,787 A | | 8/1989 | Ooki et al. |
| 4,890,962 A | | 1/1990 | Nydegger |
| 5,062,745 A | | 11/1991 | Eckman |
| 5,073,068 A | | 12/1991 | Jinkins et al. |
| 5,113,728 A | | 5/1992 | Medeksza |

(Continued)

FOREIGN PATENT DOCUMENTS

DE      2345866 A1      3/1975

(Continued)

OTHER PUBLICATIONS

European Search Report issued Jan. 13, 2009.

*Primary Examiner* — Daniel W Howell
*Assistant Examiner* — Paul Janeski
(74) *Attorney, Agent, or Firm* — Fulwider Patton LLP

(57) ABSTRACT

A drilling machine is provided for breaking chips formed by drilling action into manageable lengths. The drilling machine comprises a first gear having a first axis of rotation, and a cam follower surface. It has a second gear having a second axis of rotation coincident with the first axis of rotation. A housing is provided configured to support the first gear and the second gear, the housing having an undulating cam plate surface, a spring and a tool holder spindle having a third axis of rotation. The first and second gears are configured to impart both a linear feed and a rotation to the spindle. The first and second axes of rotation are coincident with the third axis of rotation such that the cam surface is urged into contact with the cam follower surface by the spring. The cam surface includes a plurality of steel balls positioned to follow the cam plate surface such that when the first gear rotates, the first gear is caused repeatedly to retract and then to advance, breaking chips that are formed.

20 Claims, 10 Drawing Sheets

U.S. PATENT DOCUMENTS

| | | |
|---|---|---|
| 5,291,812 A | 3/1994 | Yen et al. |
| 5,328,303 A | 7/1994 | Jang |
| 5,342,152 A | 8/1994 | Medeksza |
| 5,374,143 A | 12/1994 | Deremo |
| 5,735,646 A | 4/1998 | Finn |
| 5,752,789 A | 5/1998 | Stepan |
| 5,769,575 A | 6/1998 | Stofflet et al. |
| 5,820,312 A | 10/1998 | Stock et al. |
| 5,833,404 A | 11/1998 | Johnson et al. |
| 5,855,458 A | 1/1999 | Reynolds et al. |
| 5,911,802 A | 6/1999 | Kimura et al. |
| 6,030,156 A | 2/2000 | Andronica |
| 6,234,728 B1 | 5/2001 | Brun-Picard et al. |
| 6,637,986 B2 | 10/2003 | Powell |
| 6,857,828 B2 | 2/2005 | Weber et al. |
| 6,910,836 B2 | 6/2005 | Peterson |
| 2007/0209813 A1 | 9/2007 | Veres |

FOREIGN PATENT DOCUMENTS

| | | |
|---|---|---|
| DE | 20 2005 008 630 U1 | 10/2005 |
| DE | 102005002462 A1 | 7/2006 |
| EP | 0861996 A | 9/1998 |
| FR | 1274306 A | 10/1961 |
| JP | 60180704 A | 9/1985 |

* cited by examiner

SYSTEM AND METHOD FOR BREAKING CHIPS FORMED BY A DRILLING OPERATION

FIELD OF THE INVENTION

The present invention relates to the field of drilling machines, more specifically, a system and method applied to drilling machines that has the beneficial result of breaking into short manageable pieces the metal chips that are formed during a drilling operation.

BACKGROUND OF THE INVENTION

Power drilling machines are widely used in many industries. One of the troubling problems that grips the industry is the fact that when a helical drill bit is bored into a material it will tend to produce a helically spiraled "chip" of removed material that must find its way out of the hole created by the drill bit. When the material being drilled is a metal or polymer, such chips may be a significant problem in that they can extend up to many inches, even feet, in length. As such, they tend to get wedged between the drill bit and the walls of the hole, thus causing the drill to become stuck in the hole and damaging the surface quality of the hole. The bit may even break. These are serious problems. Valuable operator time must be taken to remove a stuck drill bit, remove the chips, and recommence drilling. A drilled hole whose wall is not smooth but damaged by chips may fail specification limits, and require not only that a new hole be drilled but that an entirely new and costly work piece be introduced. Lengthy chips may even injure the operator when they are spun about by the drilling tool.

Certain solutions have been tried in the art. Drill bits and tools have been specially engineered and shaped to reduce the length of the chips that form in the drilling or cutting process. Drill bits have been provided with an air hole extending down the length of the bit to introduce compressed air at the tip in order to expel from the drilled hole chips formed at the cutting edge. "Pecking" drilling machines have been developed that, cyclically, drill into the workpiece then retract the drill bit from the hole to remove chips before drilling into the workpiece again. Oscillating drilling machines have been developed that linearly oscillate the motion of the drill bit in relation to the drilling machine, and which have the effect of breaking chips into shorter pieces.

Despite these solutions, problems and disadvantages remain. Engineering the shape of the drill bit to create chips that break regularly into manageable lengths has the result that the drill does not have an optimal shape for cutting the hole, and the quality of the surface finish of the hole may suffer. Providing an air hole in a drill bit to expel chips with compressed air can achieve only limited results. If chips are lengthy, it is difficult to expel them with compressed air. Introducing a "pecking" action in a drilling machine also introduces costly delays in the drilling process, not to mention additional costs in the manufacture of the drill itself. Although drilling machines have also been developed that linearly oscillate the drill bit in relation to the drilling machine, these machines have required design and construction from scratch to include this feature. The solution has not embraced the potential for retrofitting existing drilling machines to solve this problem. Furthermore, no solution in this area has extended to parallel differential gear feed operated drills such as the solution that is presently identified.

Thus, a need exists in the art for an improved system and method for breaking up chips created during a drilling process to facilitate their easy extraction from a work piece. Most desirably, such an improved system and method is also needed in the field of differential gear feed operated drills. It is believed that the present invention addresses these and other needs.

SUMMARY OF THE INVENTION

According to a preferred embodiment of the invention a drilling machine with a system and method for removing chips formed by a helical drill bit is described.

In a preferred embodiment, the drilling machine has a first gear with a first axis of rotation. The first gear has a cam follower rotationally fixed to the first gear. A second gear is provided with a second axis of rotation coincident with the first axis of rotation. There is a housing configured to support the first gear and the second gear, the housing having a cam plate fixed to the housing. A tool holder spindle with a third axis of rotation is provided, wherein, the first and second gears are configured to impart both a linear feed and a rotation to the spindle, the first and second axes of rotation are coincident with the third axis of rotation, and the cam follower is adjacent the cam plate. A plurality of steel balls are partially embedded in either one of the cam plate or the cam follower, the steel balls being free to rotate. An undulating surface is provided on the other one of the cam plate or the cam follower, the undulating surface being in contact with the steel balls and being configured such that, when the first gear rotates to impart a linear feed to the spindle, the first gear is caused repeatedly to retract and then to advance.

In another aspect of the invention, the undulating surface is in contact with a first point on each of the steel balls, and the drilling machine further includes an annulus positioned to be in contact with a second point on each of the steel balls diametrically opposite the first point, the annulus being free to rotate about the spindle axis independently of the cam follower. Preferably, the annulus is mounted on ball bearings, the ball bearings being mounted on a portion of the cam follower. Further preferably, the annulus is immovable axially in relation to the first gear, and is configured to prevent movement of the steel balls axially in relation to the first gear, and the undulating surface defines a channel shaped to receive a portion of each of the steel balls, whereby contact pressure between each steel ball and the undulating surface is reduced.

These and other advantages of the invention will become more apparent from the following detailed description thereof and the accompanying exemplary drawings.

DETAILED DESCRIPTION OF THE PREFERRED EMBODIMENTS

There is first described herein a positive feed drilling machine. Thereafter there is described a particular system and method for breaking chips formed by the drilling machine during a drilling operation.

Figure 1:
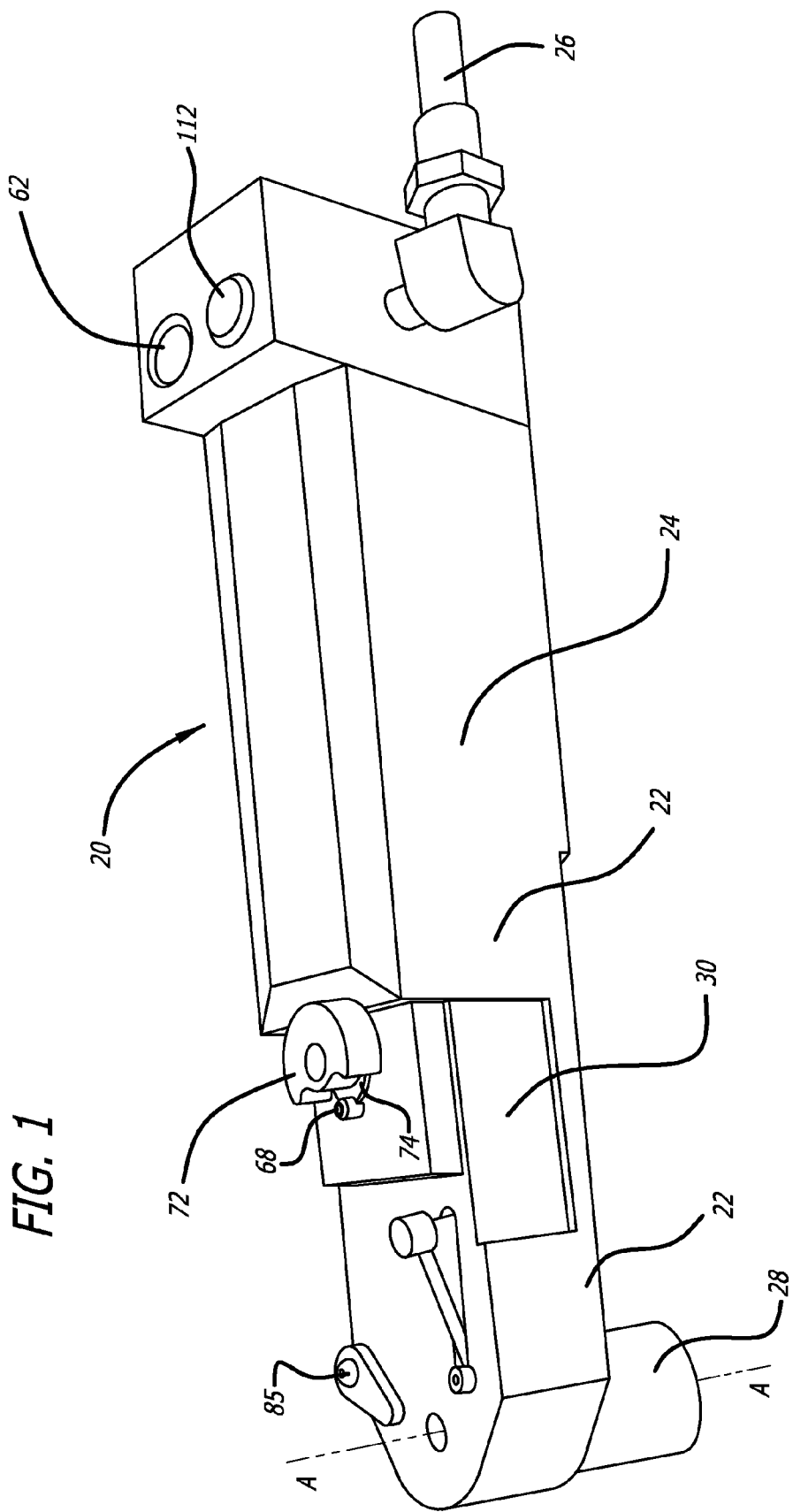
FIG. 1 represents a perspective view of a portable pneumatic drilling machine showing features of the invention.

With reference to FIG. 1, a pneumatic drilling machine, generally referred to by the numeral 20, and method according to a preferred embodiment of the present invention, is described. In general terms, the machine 20 illustrated in the figure is surrounded by a housing 22 and includes a conventional pneumatic motor 24. The motor is connectable to an external source of compressed air 25 (not shown in FIG. 1) through a connector 26. A tool holder spindle 28 held by the housing 22 is adapted to be rotatable about its axis A, and to move the tool back and forth along its axis A. A mechanism 30 for driving the spindle and for controlling the movement of the spindle 28 is located within the housing. Drilling tools can be mounted and removed from the spindle in a conventional manner.

The drive mechanism 30, which is schematically exemplified in FIGS. 2-5, includes a conventional mechanism known as a positive feed drill. An external source of compressed air 25 supplies compressed air to the drive mechanism 30 via the connector 26. Within the drilling machine housing, the compressed air is circulated, as described herein, through a series of ducts which collectively form a pneumatic circuit. FIGS. 2-5 exemplify additional features of the present invention, and, in the description below, the terms "lower," "upper," "horizontal," "left," and "right" relate to FIGS. 2-5.

In a preferred embodiment, the drive mechanism 30 includes a lower gear (or, drive gear) train 32 comprising gears 34, 36, 38, 40, and 42 intermeshing in series, and an upper gear (or, feed gear) train 44 comprising gears 46, 48, 50, and 52 intermeshing in series. The spindle 28 passes through the end gears 42 and 52 of each gear train. The lower and upper gear trains may be stationary, or rotate in various modes, as described herein.

In the idling mode, power is supplied via the motor 24 to lower gear 34, which imparts power only to the lower gear train 32. In this mode, the upper gear train 44 rotates only under frictional connection with the lower gear train 32, so that lower and upper gear trains rotate at the same speeds, causing the spindle to rotate under power, but not causing the spindle to advance or retract along its axis A.

In the feed, or advancing, mode, lower gear 34 is supplied with power from the motor 24 as before, but upper gear 46 is caused (as described herein below) to engage via conventional dog collar linkage to lower gear 36, thus placing both upper and lower gear trains under power. The number of teeth of upper and lower gear trains are selected to differ by preferably one or two teeth, causing the upper (feed) gear 52 to rotate about the spindle 28 at a slightly faster speed than lower (drive) gear 42. By conventional means, this difference in rotation speeds is harnessed to cause the spindle 28 to advance downwardly at a relatively slow speed through the upper end gear 52 and the lower end gear 42, while simultaneously rotating clockwise. This arrangement, wherein at least two parallel gears with different numbers of teeth are configured to both feed and rotate a spindle is known in the art as a parallel differential gear feed.

In the retraction mode, lower gear 34 is supplied with power from the motor as before, but upper coupling gear 46 is caused (as described herein below) to move upward to engage by conventional dog collar means a braking disc 54 which is fixed to the housing and unable to rotate. It will be appreciated that, under these conditions, the upper gear 44 train cannot rotate at all. It will be further appreciated that in this mode the lower gear train 32 will rotate faster than the upper gear train by a relatively large difference. By conventional means, this large difference in rotation speeds is harnessed to cause the spindle 28 to retract at a relatively rapid rate through the upper end feed gear 52 and the lower end drive gear 42, while simultaneously rotating clockwise.

Figure 2:
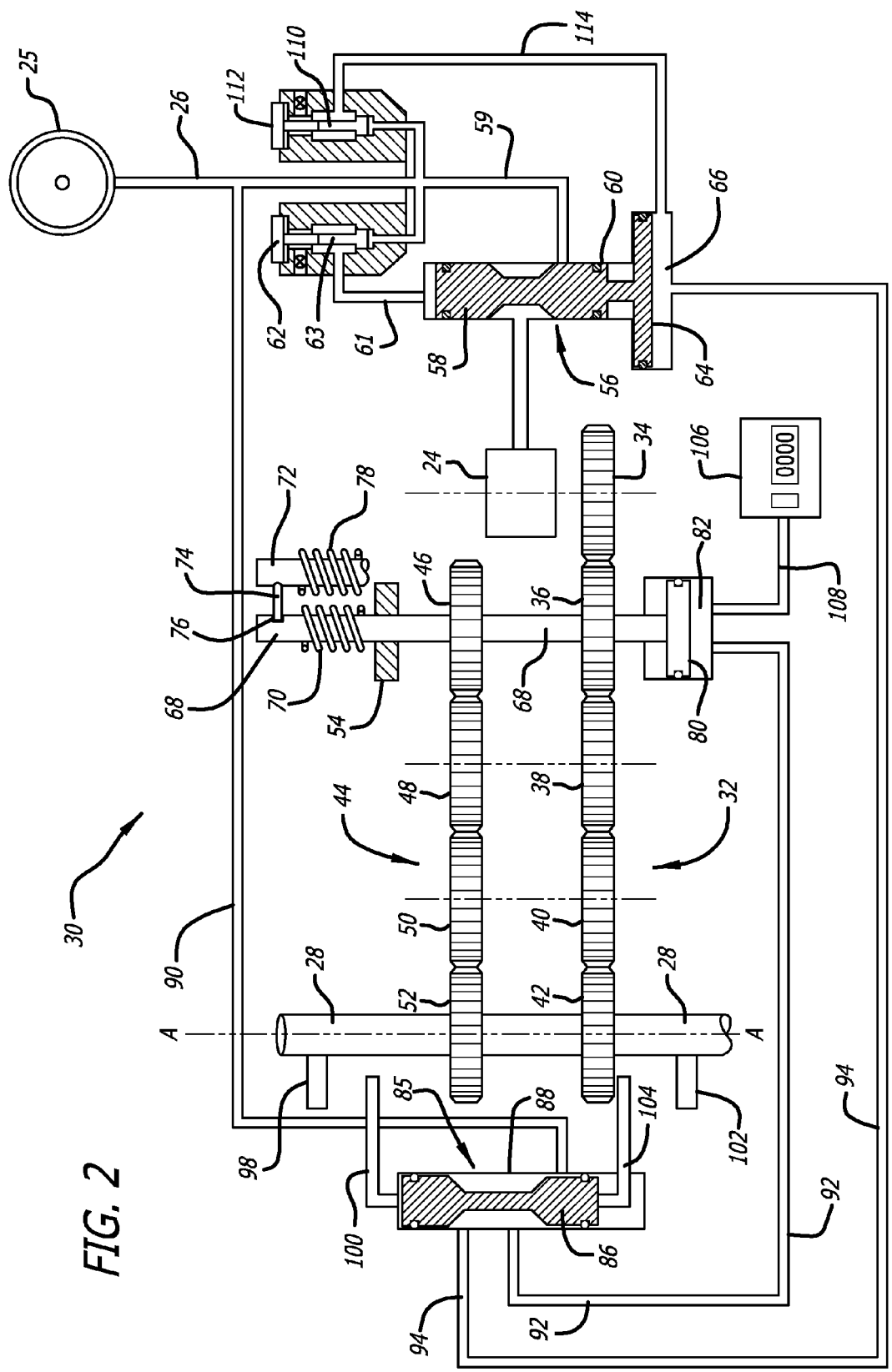
FIG. 2 is a schematic view showing aspects of a driving mechanism which controls the power supply and automatic shutoff of compressed air supply to the drilling machine of FIG. 1, schematically showing aspects of the drive mechanism in standby mode.

A further aspect of the drive mechanism 30 is the supply valve 56 positioned between the external compressed air supply 25 and the motor 24. The supply valve 56 includes a shaped slide 58 movable within a cylinder 60. The top of the cylinder 60 may be connected by air duct 61 to a micro valve 63 that presents an exposed surface or button 62 for manually activating the micro valve 63 which, in turn, activates the supply valve 56. The slide 58 is configured so that, upon downward displacement (FIGS. 3-5), it will permit the passage of compressed air from the source 25 via duct 59 through the valve 56 to the motor 24. At the lower end of the supply valve 56 is a shut-off piston 64 connected to the slide 58. The shutoff piston 64 resides within a shut-off chamber 66. A sufficient pressure in the shut-off chamber 66 is capable of lifting the shut-off piston 64 and slide 58 upwards to interrupt the supply of compressed air to the motor 24. (FIG. 2)

Yet another aspect of the drive mechanism 30 is the coupling shaft 68 which is configured to rotate in, and slide through, lower coupling gear 36 and to rotate in, but to be translationally connected with, upper coupling gear 46. Thus, any translational movement of the coupling shaft 68 will translationally carry upper gear 46 with it. A coupling spring 70 is positioned to bias the coupling shaft 68 downward. Adjacent the coupling shaft is an idler lock 72, having an arm 74 configured to removably engage with an indent 76 in the coupling shaft 68. A torsion spring 78 torsionally biases the idler lock 72. Fixed above the upper gear 46 is the braking disc 54 fixed to the housing and unable to rotate, so that an upward movement of the coupling shaft 68 engages upper gear 46 with the braking disc 54, a downward movement of the coupling shaft engages upper gear 46 with gear 36. In an intermediate position, the coupling shaft 68 is free from connection with either the brake disc 54 or the lower gear 34. Connected to the lower end of the coupling shaft 68 is a coupling piston 80 residing within a coupling chamber 82. A sufficient pressure in the coupling chamber 82 is capable of lifting the coupling piston 80 and coupling shaft 68 against the bias of the spring 70.

Another aspect of the drive mechanism 30 is the control valve 85 that includes a shaped stem 86 sliding within a cylinder 88. A supply of compressed air is brought directly from the compressed air source 25 to the control valve 85 by a duct 90. The control cylinder 88 is connected via a duct 92 with the coupling chamber 82, and via a duct 94 with the shut-off chamber 66. The control valve 85 is configured to have two modes, corresponding with two vertical positions of the shaped stem 86 within the cylinder 88. In a first mode, the stem 86 is in an upper position and configured to pneumatically connect the coupling chamber 82 with the shut-off chamber 66 via duct 92 and duct 94, but prevent the supply of compressed air 25 to both the shut-off chamber and the control chamber, as exemplified in FIG. 2. In a second mode, the stem 86 is in a lower position and permits compressed air to be fed from the compressed air source 25 to the coupling chamber 82, but interrupts the pneumatic connection between the coupling chamber 82 and the shut-off chamber 66, as exemplified in FIG. 5.

The vertical position of the stem 86 of the control valve 85 may be set by movement of the spindle 28, as follows. An upper spindle nut 98 is attached to the spindle 28 so that downward movement of the spindle brings the upper spindle nut 98 in contact with an upper valve arm 100 to move the stem 86 downwards. A lower spindle nut 102 is attached to the spindle 28 so that upward movement of the spindle brings the lower spindle nut in contact with a lower valve arm 104 to move the stem upwards.

A further aspect of the drive mechanism is that it includes a pneumatic counting device 106, pneumatically connected with coupling chamber 82 via duct 108. The counting device may be a commercially available counting device such as Part No. PM1421 by Ellis/Kuhnke Controls, of Atlantic Highlands, N.J. 07716. The counting device is adapted to count the number of drive cycles performed by the drilling machine so that service requirements on the machine may be performed as required. Each time compressed air is delivered to the coupling chamber 82 (as described herein below), the counting device will add one cycle to the total number of cycles counted.

In use, the drilling machine 20 may be operated as follows.

The drive mechanism is initially configured in a standby mode, as schematically represented in FIG. 2. In standby mode, the supply valve 56 is closed in a first position, thus interrupting supply of compressed air 25 to the motor 24. The coupling shaft is in an intermediate position, held in place by the arm 74 on the idler lock 72. The control valve 85 is in an upper first position with the slide 86 interrupting supply of compressed air to the coupling chamber 82.

Figure 3:
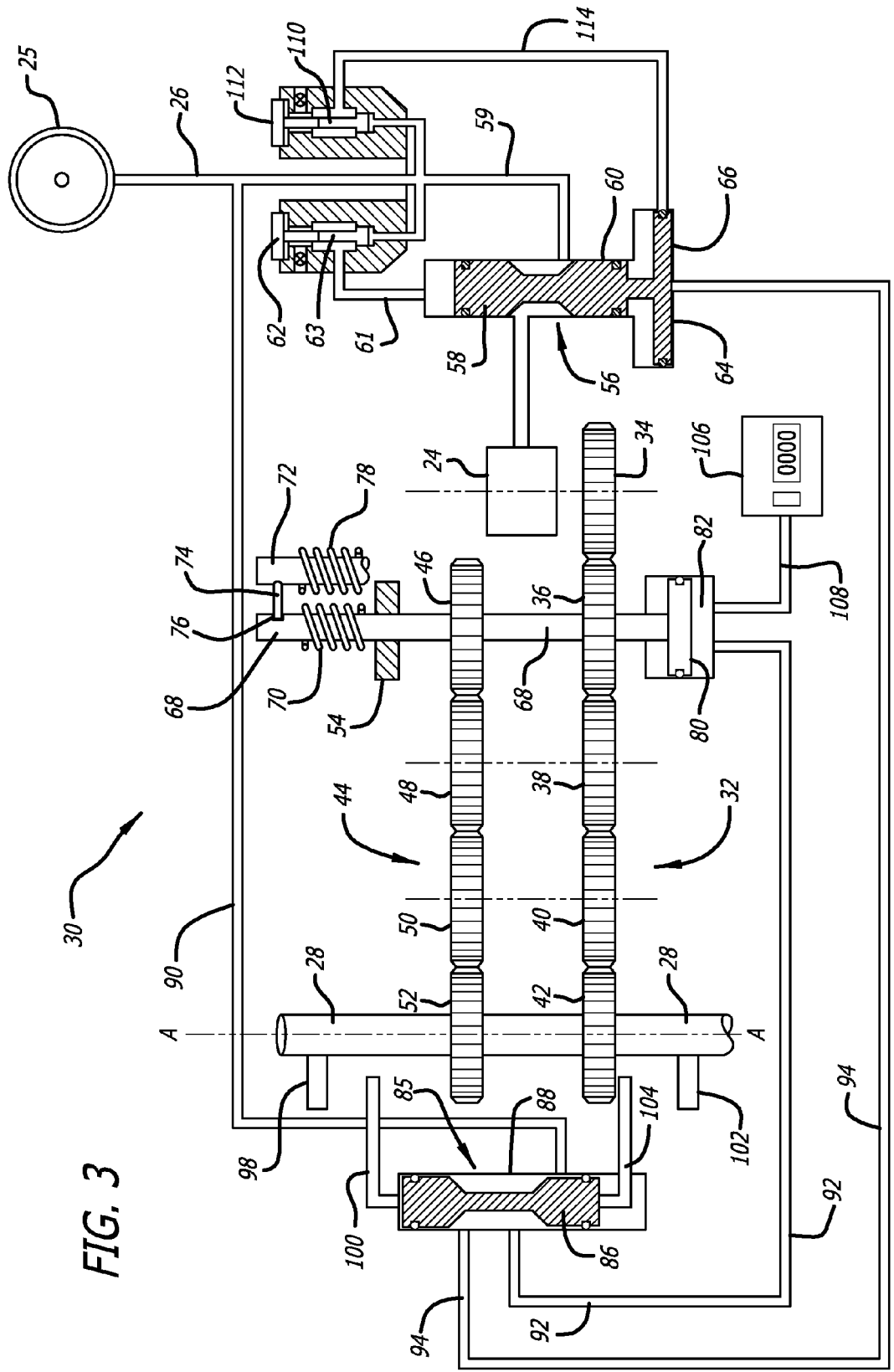
FIG. 3 is the schematic view of the preceding Figure, schematically showing aspects of the drive mechanism in idle mode.

The standby mode may be followed by the idle mode, as schematically represented in FIG. 3. The motor is activated by manually depressing the start button 62. The momentary opening of the micro valve 63 directs an air signal above the slide 58 of the supply valve 56 via the duct 61 displacing the slide to open the supply valve, and thus opening the compressed air supply going to the motor 24, to cause the motor to turn and supply power to lower gear 34, and hence to the entire lower gear train 32. At this stage the coupling shaft 68 is positioned in an intermediate position so that gear 46 is engaged with neither the brake disc 54 nor lower gear 36. In this position the drive mechanism 30 is in the idle mode, with the spindle 28 under rotational or driving power from the lower gear train 32, but not under translational or feeding power.

Figure 4:
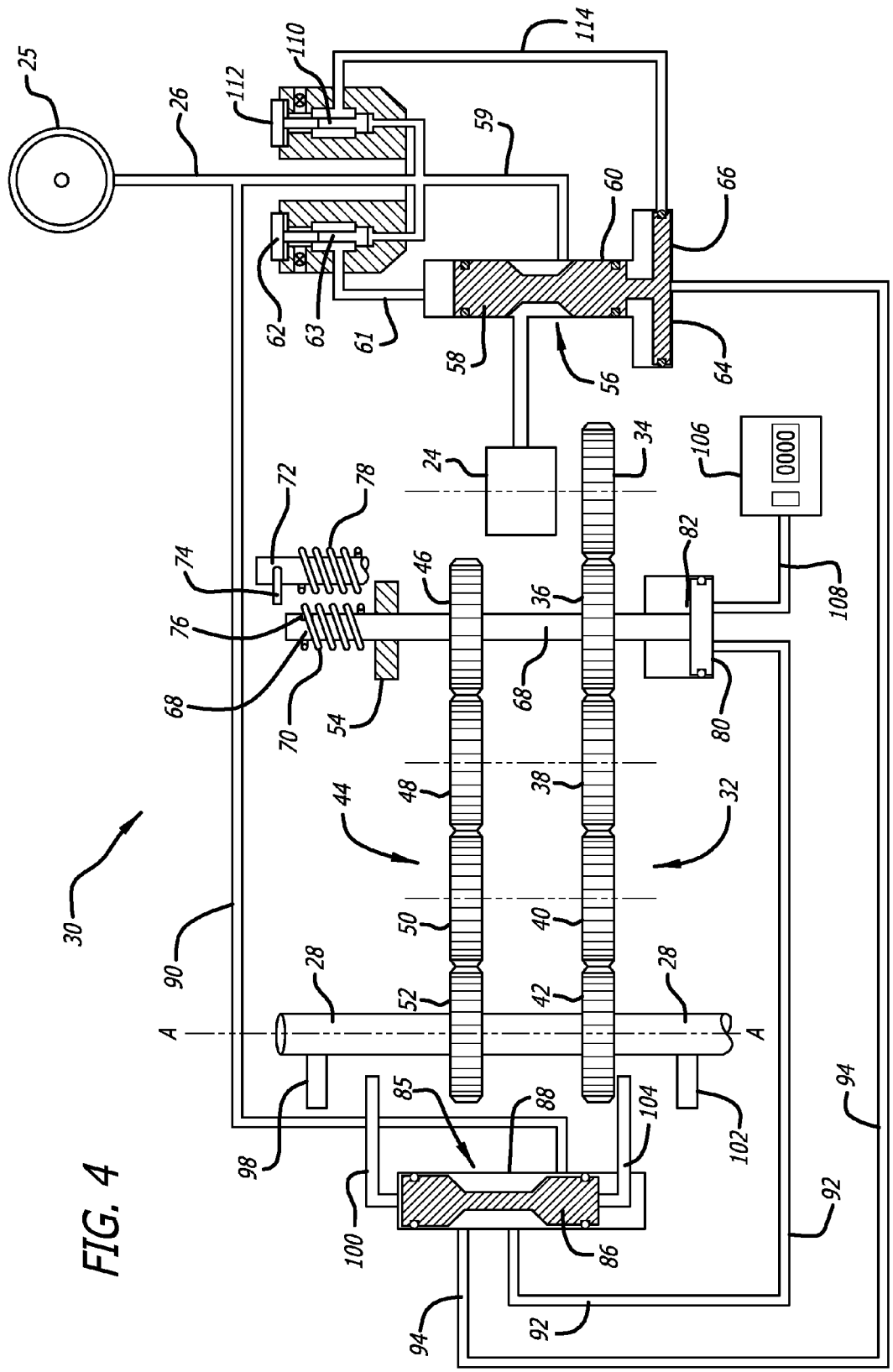
FIG. 4 is the schematic view of the preceding Figures, schematically showing aspects of the drive mechanism in feed mode.

The idle mode may be followed by the feed mode, as schematically represented in FIG. 4. In order to engage the upper gear train 44 to advance the spindle 28, the idler lock 72 may be turned sufficiently to allow the arm 74 to disengage from the indent 76 in the coupling shaft 68. This will allow the coupling shaft 68 under the biasing action of the spring 70 to move down and engage the upper coupling gear 46 with the lower coupling gear 36. The tool now enters the feed, or advancing, mode, with the spindle 28 rotating and being advanced slowly under power. The feed action of the spindle will continue until the upper spindle nut 98 reaches and pushes down on, the upper valve arm 100 to depress the stem 86 within the cylinder 88 of the control valve 85, as exemplified in FIG. 5, thus leading to the retraction mode, as detailed below.

Figure 5:
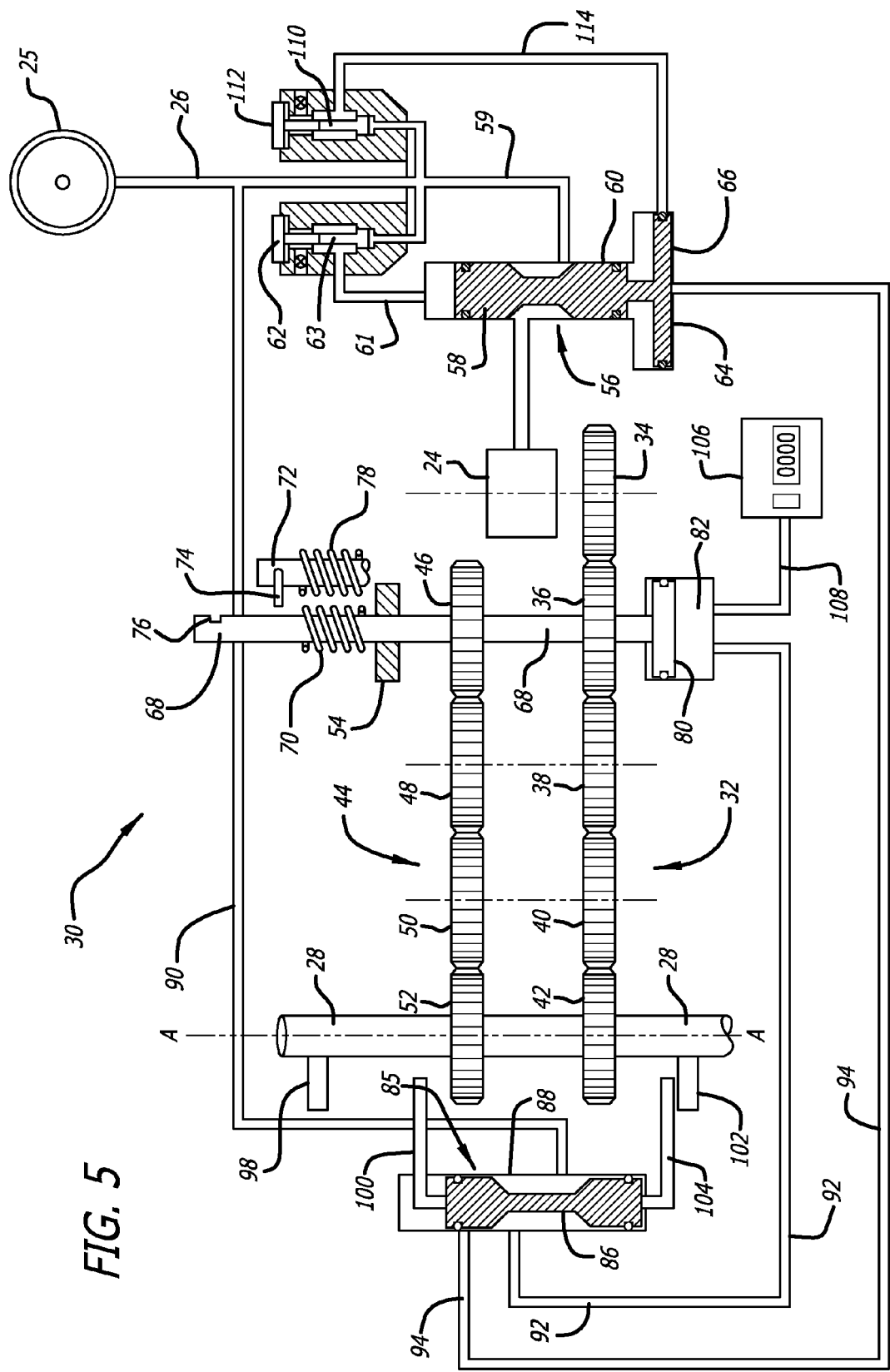
FIG. 5 is the schematic view of the preceding Figures, schematically showing aspects of the drive mechanism in retraction mode.

The feed mode may be followed by the retraction mode, as schematically represented in FIG. 5. The downward movement of the control valve stem 86 allows compressed air to flow into the coupling chamber 82, forcing up the coupling piston 80 and hence the coupling shaft 68, thereby ending the spindle feed process by disengaging the upper coupling gear 46 from lower coupling gear 36, and locking the upper gear 46 against the brake disc 54 of the upper housing. The immobilization of the upper gear train 44 will initiate the retraction phase (or return cycle) characterized by a fast return of the spindle (about 1 mm per revolution), until the lower spindle nut 102 reaches and elevates the lower valve arm 104, returning the valve stem 86 to its first upper position, as exemplified in FIG. 2, thereby to end the retraction mode, as set forth below.

The return of the valve stem 86 to its first position firstly disconnects the compressed air supply 25 from the coupling chamber 82 (FIG. 2), and, almost simultaneously, connects duct 94 with duct 92, thus pneumatically connecting the coupling chamber 82 with the shut-off chamber 66. It will be appreciated that when the stem 86 was in its second lower position, the pressure in duct 94 was around atmospheric pressure, but the pressure in the coupling chamber 82 was under compression from the source 25, which may be in the region of 90 psi. Thus, when the upward movement of the stem 86 disconnects the coupling chamber 82 from the compressed air supply 25, but connects the coupling chamber 82 to the shut-off chamber 66, the compressed air present in the coupling chamber 82 is at an elevated pressure (i.e. well above atmospheric pressure) and will rapidly discharge into the shut-off chamber 66 until the pressure in both chambers 82 and 66 and their related ducts is equalized. Furthermore, at the same time, the coupling spring 70 biases the coupling piston 80 downwards, adding to the escape of air from the coupling chamber 82 into the shut-off chamber 66 by expressing an additional volume, or "bolus," of air (about 0.1 cu. inches) from the coupling chamber 82. It will be appreciated that the resulting upward force applied to the shut-off piston 64 will lift the supply valve slide 58 to its upper first position (FIG. 2) to cut connection of the main air supply 25 to the motor 24, thus shutting off the motor 24. The drive mechanism is now in standby phase, the same condition it was in prior to pressing button 62. To start the whole cycle over, the user may press button 62 once again.

It will be appreciated that the manner in which the supply valve 56 is closed, as described in the preferred embodiment, may be accomplished by transmitting a pneumatic signal directly to the supply valve via the pneumatic circuit within the housing, specifically by the ducts 92, 94. Thus, in a preferred embodiment, the force applied upon the valve 56 to move it to a closed position is a positive pneumatic force, i.e., a force not applied by a mechanical action upon the supply valve itself. Moreover, in another aspect, the source of the pneumatic signal may derive from a fixed quantity of air trapped at elevated pressure within a reservoir located in the drive mechanism. In a preferred embodiment, the reservoir may include the coupling chamber 82, its supply duct 92, and also may include a volume defined by the cycle counting device 106 and its supply duct 108 if present. The fixed quantity of air trapped at elevated pressure within a reservoir located in the drive mechanism may be distinguished over an effectively limitless supply of compressed air from the main source of compressed air 25 which is not trapped in the drive mechanism.

A significant aspect of a preferred embodiment of the invention is that the ending position of the slide 86 of the control valve 85 at the end of a drilling cycle is the same as its starting position prior to activation of the drilling cycle, and that, at both the start and the end of a drilling cycle (as seen in FIG. 2), the main compressed air supply 25 to the motor 24 is closed by the supply valve 56 and the compressed air supply to the coupling chamber 82 is closed by the control valve 85, thus giving rise to a completed cycle of operation in all respects. If, for example, the slide 86 connected the compressed air supply 25 with shut-off chamber 66 upon the upward movement of the slide 86 at the end of a drilling cycle, the compressed air has raised the slide 58 to turn off the motor 24. However, it will be appreciated that compressed air would now be supplied to the shut-off chamber 66 at the start of a new drilling cycle, a condition which may prevent the slide 58 from being downwardly activated, with disruptive consequences.

An additional aspect of the drilling machine is the emergency valve 110 with its activation button 112. The valve 110 is also a micro valve, configured to direct compressed air from the source 25 direct to the shut-off chamber 66 of the supply valve 56 via a duct 114. As will be appreciated, the compressed air in the shut-off chamber 66 will force the slide 58 of the supply valve upwards to interrupt air supply to the motor 24. In case of an emergency, depressing the activation button 112 will activate the micro valve 110 which in turn will shut off the supply valve 56 and the motor 24. A bleed hole in the shutoff chamber 66 allows for the decompression of the chamber 66, thus allowing the supply valve 56 to be turned on again.

A further significant feature of a preferred embodiment of the invention is that the cycle counter 106 is pneumatically connected to the coupling chamber 82. This has the advantage that a driving cycle is only counted once the spindle has completed a feed phase, marked by the advance of the control valve 85 to its second position, upon the drive mechanism entering the retraction phase. Accordingly, if the emergency shutoff valve 110 is activated by pressing emergency button 112 in the middle of a feeding phase, an additional cycle will not necessarily be added to the counter when the motor is turned on again. Only upon the commencement of a retraction phase will the counter add one cycle to the total. It will be appreciated that this feature has an advantage over systems that add one cycle to the total every time the motor is switched on. In such machines, interrupted but recommenced drive cycles count as a full cycle upon each recommencement, thus biasing the total count to a higher level than actually carried out by the drilling machine, and leading to uneconomical servicing of the machine or replacing its accessories such as drill bits.

Thus, the preferred embodiments of the invention provide for an inexpensive and reliable device and method for automatically controlling a drilling machine. The use of a pneumatic control over the supply valve 56, which controls the supply of compressed air to the drive mechanism, eliminates the dangers present in the use of mechanical parts which tend to wear down during the lifetime of a drilling machine. Moreover, a pneumatic control system is typically easier to assemble than a mechanical control system, and eliminates much of the labor intensive operation of assembling the small mechanical pieces of a mechanical control system.

Turning now to FIGS. 6-13, a different aspect of the invention is exemplified, namely a system and method directed to breaking up chips formed by drilling action, to facilitate removal of the chips from a hole formed in the workpiece by drilling.

Figure 6:
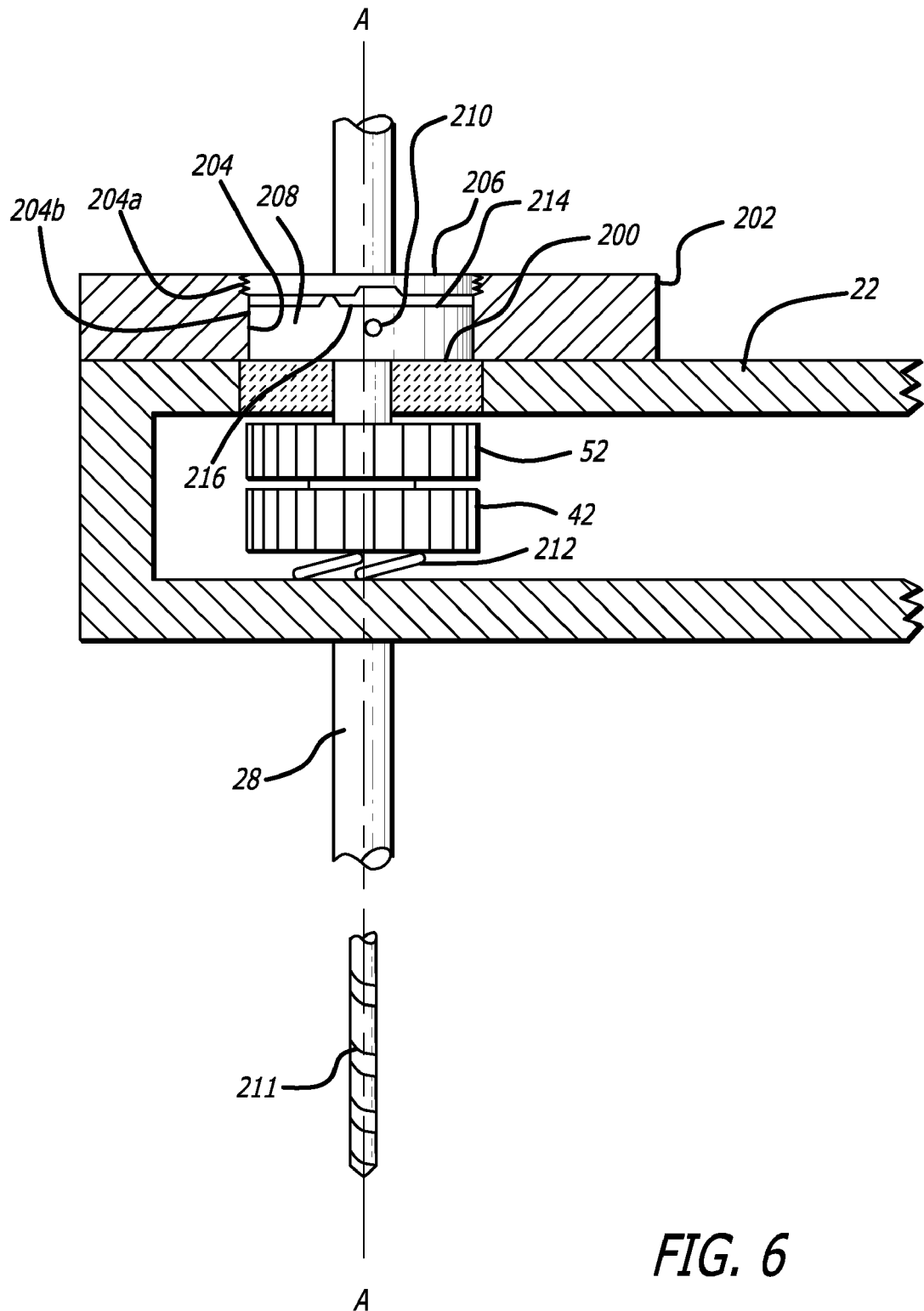
FIG. 6 is an sectional view, in partial breakaway, of the spindle drive system of the above drilling machine of FIG. 1, showing further aspects of the invention.
Figures 7, 8:
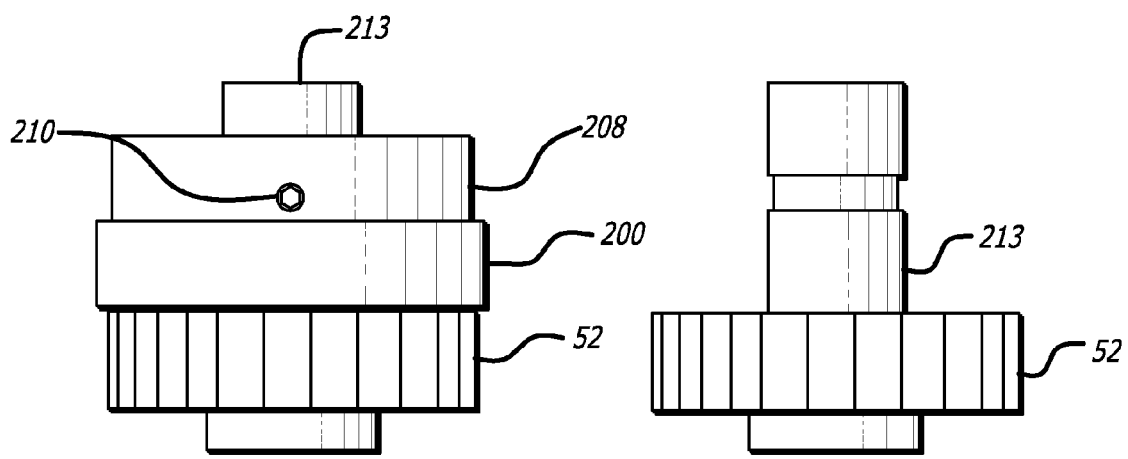
FIG. 7 is a perspective view of the drive gear of FIG. 6, placed within bearing and cam follower plate.
FIG. 8 is a perspective view of the drive gear of FIG. 6.

FIGS. 6-13 show in greater schematic detail a preferred interrelationship between the upper feed gear 52, the lower drive gear 42, and the surrounding housing 22. The feed gear 52 is shown positioned adjacent a bearing 200 that is held by the housing and configured to rotationally support the feed gear. The tool holder spindle 28 passes through the bearing 200, and through both the upper feed gear 52 and lower drive gear 42, as described in more detail above. On the outer surface of the housing, a holder plate 202 is positioned, and removably attached to the housing by means of screws (now shown). The holder plate defines an orifice 204 positioned directly above the bearing 200. The bore of the orifice is divided into two portions 204a and 204b. Upper portion 204a is internally threaded, and is configured to receive an annular cam plate 206 having external mating threads. Once the cam plate 206 is positioned in the orifice of the holder plate 202 at the correct level, it is fixed in place using set screws (not shown), so that the cam plate 206 is rotationally fixed with respect to the holder plate, and having the holder spindle passing through its center. Lower portion 204b of the bore of the orifice 204 is not threaded, and is sized to receive annular cam follower 208 that is free to rotate in the lower portion 204b. The cam follower 208 has an opening 210 for receiving a set screw that fixes the cam follower 208 to a cylindrically upper portion 213 of the upper feed gear 52 (FIGS. 7 and 8). The disassembled configurations of feed gear 52, bearing 200, and cam follower 208 are shown in FIGS. 7 and 8. In this fixed configuration, the cam follower 208 rotates in unison with the feed gear 52 supported by the bearing 200. Thus, it will be appreciated, as the feed gear 52 is rotated, the cam follower 208 will rotate so that its upper surface passes across the rotationally fixed lower surface of the cam plate.

Below the feed gear 52 is the drive gear 42, both gears configured by conventional means, as previously described herein, to produce both a rotating action and a linear feeding action to the tool holder spindle 28 which imparts the same actions to the cutting tool 211. Below the drive gear a cutter spring 212 is positioned to urge the assembly comprising gears 42, 52 and spindle 28 in an upward direction.

Of importance to this aspect of the invention is the fact that the lower surface 214 of the cam plate 206 is shaped with an undulating configuration whose preferred profile is described below herein. The upper surface 216 of the cam follower 208 is shaped with protrusions or undulations for interacting with the shape of the lower surface 214 of the cam plate as the cam follower is rotated, so that, as the feed gear is rotated, the interaction of the lower surface of the cam plate and the upper surface of the cam follower cause the assembly comprising the gears 42, 52 and spindle 28 to oscillate along the axis A-A of the spindle, with the cutter spring 212 urging the assembly upwards each time it is displaced from its upper starting position.

In accordance with the principles of this invention, the surfaces 214 and 216 may assume a number of alternative shapes, and the scope of the invention is not limited by the specific embodiments described herein. Preferably, the shape is rotationally symmetrical about the diameter, to avoid vibrations when the gear is rotated.

In use, the system operates as follows. It will be appreciated that, when the feed gear 52 and drive gear 42 are being rotated in the advance mode, as has been described above, the rotating upper surface 216 of the cam follower 208 and the stationary lower surface 214 of the cam plate 206 are urged into contact with each other by the cutter spring 212. It will be further appreciated that every time the cam follower surface passes over the crest of a wave on the cam surface to descend on the other side of the crest, the feed gear will be forced upwards by the cutter spring 212 so that the spindle 28, while being advanced downward by the rotation of the feed gear assembly will, momentarily, also be retracted upward by the described action. The combination of the advance vector and the retraction vector may cause the feed of the spindle to momentarily slow down, to stop, or even to retract, depending on a number of factors, as discussed more fully below. Thus, the average feed speed of the spindle remains constant, but its momentary feed speed is modified by a series of retardations and advances superimposed on the feed, in accordance with the above broadly described principles.

Figure 9:
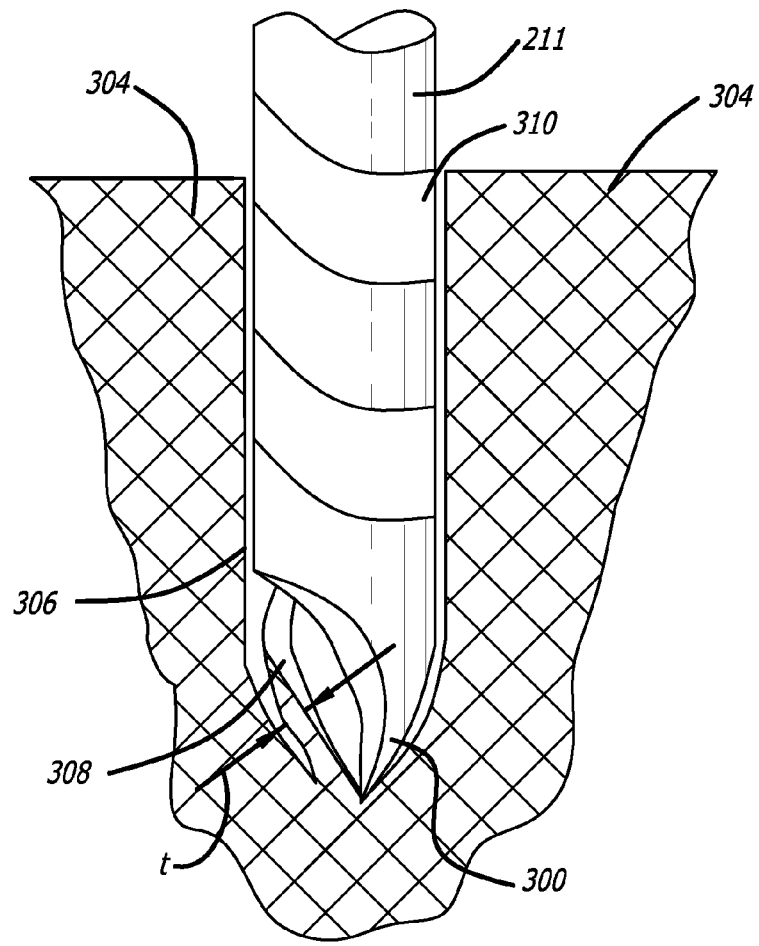
FIG. 9 is a schematic view of a drill bit slicing a chip from the bottom of a hole being drilled in a workpiece.

The significance of the above operation may be understood by reference to FIG. 9, which exemplifies how the cutting edge 300 of a drilling tool 211 cuts into a work piece 304 at the bottom of a drilled hole 306. Under ordinary circumstances, the tool 211 advances linearly at a constant speed or rate of linear displacement, so that the cutting edge produces a chip 308 of generally constant thickness "t" (FIG. 9). Being of constant thickness, the chip has little tendency to break, but coils away continuously from the cutting point as a helical coil that must find its way out of the hole 306 following the helical flutes 310 in the tool 211. It will be appreciated that a portion of this continuous chip may become stuck in the tool flutes 310 on the way out, so that the chip being formed at the cutting edge is blocked, and has no way out. At this point, the tool tends to become stuck in the hole, or the chip volume swells in the flutes to damage the walls of the hole as the tool spins.

However, when the gearing is configured to impose a small backward and forward oscillation upon the forward feed of the tool, as described above, every time the forward motion of the cutting edge 300 is retarded by this oscillation without its spinning motion being altered, the cutting edge 300 will tend to reduce the thickness of the chip 308 or will even cut the chip completely, so that the chip is broken into multiple small lengths. This action prevents the chip from forming a long helical spiral. In such small pieces, the chips are more easily extracted from the hole 306. A multitude of small chips are inherently easier to extract from the hole under ordinary circumstances. Moreover, it will be appreciated that when the tool includes an air hole extending to the tip of the tool, compressed air fed through the air hole will more easily blow out short chips than long spirally formed chips.

Turning now to preferred shapes and general configurations of the upper surface 214 and the lower surface 216, the preferred objective is to provide the spindle 28 with a momentary retraction displacement that is substantially the same as the feed displacement the spindle advances in one revolution. Thus, if, for example, the feed displacement per revolution is one thousandth of an inch, the thickness of the chip will be about one thousandth of an inch. If an oscillation with an amplitude of one thousandth of an inch is imposed on this spindle, then each retraction will tend to slice the chip to a zero thickness and break it. It will also be appreciated that the chip will tend to break even if its thickness is not reduced to exactly zero. In order to achieve this advantageous result, a number of preferred shapes are described.

Figure 10:
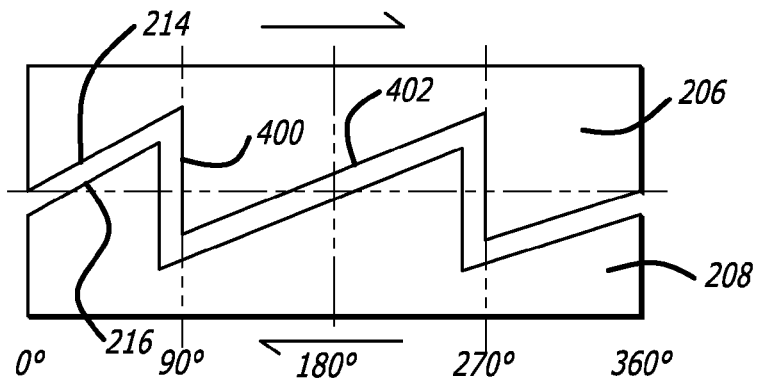
FIG. 10 is a schematic view, showing 360 degrees of the circumference, of one embodiment of the lower surface of a cam plate mating with the upper surface of a cam follower.
Figure 11:
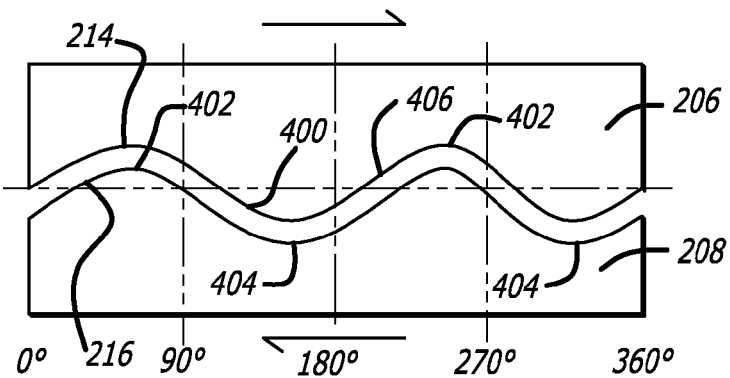
FIG. 11 is another embodiment of the configuration shown in FIG. 10.
Figure 12:
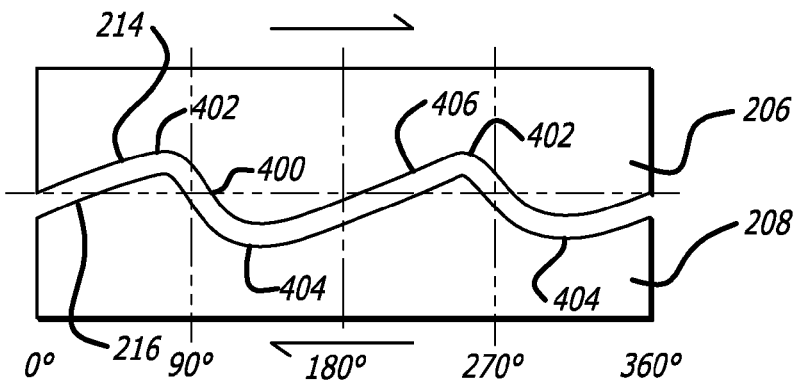
FIG. 12 is yet another embodiment of the configuration shown in FIG. 10.

FIGS. 10-12 show how the upper surface 214 and lower surface 216 may have mating profiles. FIG. 10 shows how the upper surface 214 of the cam plate may have a sharp step 400, followed by a linearly increasing portion 402 from the foot one step to the head of the following step. FIG. 11 exemplifies how the upper surface 214 may be given an evenly distributed undulating profile, such as a sinusoidal profile. A gently declining portion 400 from a peak 402 to a trough 404 is followed by a gently increasing portion 406. FIG. 12 exemplifies how the upper surface 214 may be given a skewed undulating profile, in which the slope of the declining portion 400 is greater than the slope of the increasing portion 406. Although FIGS. 10-12 show each surface having a wavelength of 180 degrees, i.e. two waves per revolution, in another embodiment it could have three, or four waves, or even a single wave, per revolution.

Figure 13:
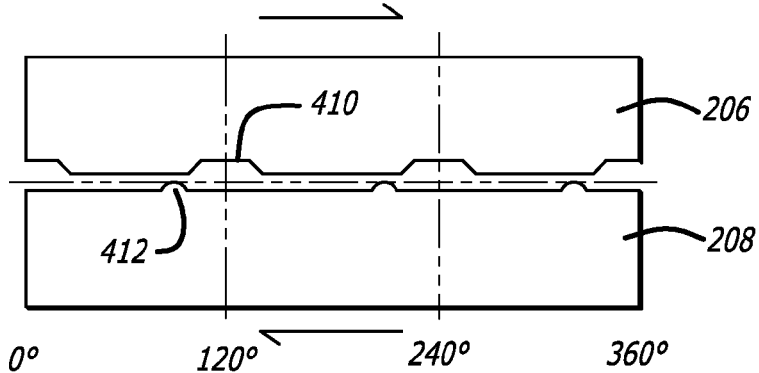
FIG. 13 is a final embodiment of the configuration shown in FIG. 10.

FIG. 13 exemplifies how the upper surface 214 and lower surface 216 do not have mating profiles. Rather, the upper surface may have cam troughs 410 having a certain length, and the lower surface may have follower bumps 412 having a length shorter than the length of the troughs. This provides the advantage of allowing the cam follower to follow the profile of the cam surface more precisely, and also reduces the frictional point of contact between the two camming parts with advantages for thermal gain.

In a preferred embodiment, the amplitude of oscillation imparted to the spindle 28 is configured to be substantially equal to the distance the drill feeds per revolution, i.e. within a range of +−10%. Thus, for example, if the feed rate is one thousandth of an inch per revolution, the amplitude of oscillation is desirably substantially one thousandth of an inch. It will be appreciated that this same amplitude may be imparted to the spindle 28 by simply providing the undulations on the cam plate with that amplitude. However, if the speed of rotation of the cam follower in relation to the stationary cam plate is high, it will be further appreciated that the amplitude of the spindle may be less than the amplitude of the undulations due to the inertia of the spindle. In other words, the cam follower profile 116 may not exactly follow the profile of the cam plate 114, in that the cam follower may in places "take off" from the crest of a cam surface wave and land on the cam plate some distance away, beyond the next wave trough, or low point, thereby reducing the effective amplitude of oscillation of the spindle. This effect may be measured and accounted for in forming the shape of the cam surface 214 and the cam follower surface 216.

It will be appreciated that by making minor modifications to the housing and to the feed gear according to the principles set forth above, a pre-existing drilling machine may be retrofitted to render it capable of producing chips that are of a manageable size, suitable for being expelled from a hole under compressed air fed through the drill bit. It will also be appreciated that the terms "cam surface" and "cam follower" as used herein are the equivalent of each other as far as their profiles are concerned when one is in contact with the other. The cam surface and cam follower may have their profiles interchanged without altering the behavior of the invention. Cam surface is used to indicate that the surface is fixed with respect to the housing, and cam follower is used to indicate the surface rotates with respect to the housing.

Turning now to yet a further embodiment of the invention, exemplified in FIGS. 14-17, there is described a further aspect to providing an oscillating action to a rotating spindle in a positive feed drill. The solution provided by this embodiment has been found to have the additional advantage over the above described embodiments insofar as it produces a solution with greatly reduced friction, and accordingly greatly reduced heat gain during operation.

Figure 14:
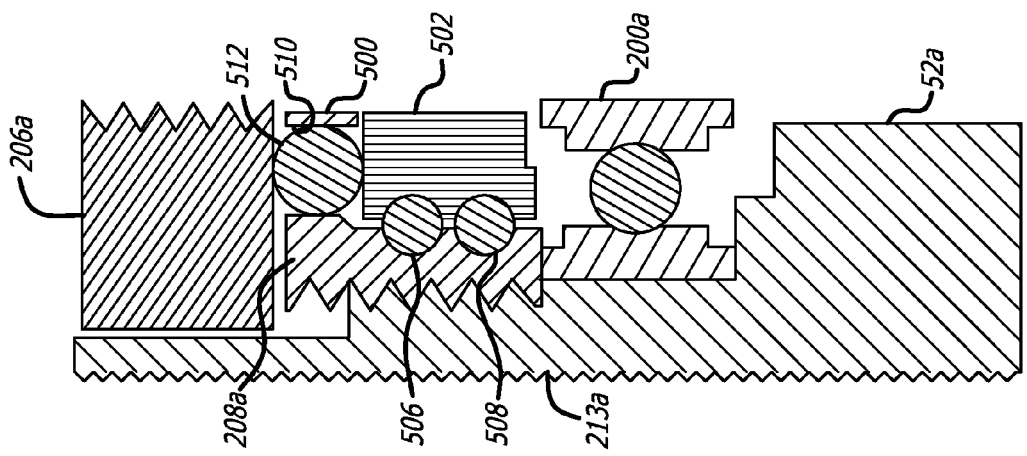
FIG. 14 is a sectional view showing features of yet a further embodiment of the invention.
Figure 14:
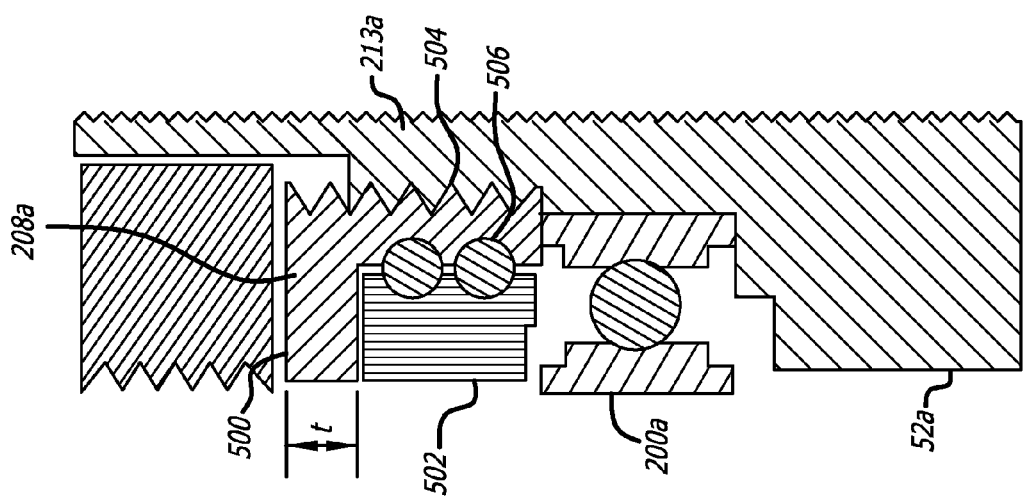

An aspect of this embodiment is the inclusion of a ball bearing structure inserted into the cam follower as described herein below. The feed gear structure of the previous embodiment, best seen in FIGS. 6-8, is modified according to the following structure, as best understood by reference to FIG. 14 which is a sectional view through the feed gear and related structure. Firstly, the feed gear 52 itself, the bearing 200, and the cam plate 206 shown in FIGS. 6-8 are carried over without substantial modification to the new embodiment shown best in FIG. 14 as feed gear 52a, bearing 200a and cam plate 206a. However, the cam follower 208 shown in FIGS. 6-8 is substantially modified and is referenced as cam follower 208a in the new embodiment of FIG. 14. Furthermore, the cylindrical upper portion 213 as shown in FIGS. 6-8 is also modified to receive the modified cam follower 208a, and referenced as upper cylindrical portion 213a in the new embodiment, as shown in FIG. 14.

The first modification in cam follower 208a is that it is configured to be threadably connected to cylindrical upper portion 213a, rather than with a set screw 210 as in the previous embodiment. To preserve the threaded connection under operating conditions, a thread portion 504 of the cam follower 208a is counter-threaded, thereby preventing slow unwinding during use. The next modification in cam follower 208a is that it is split into a fixed upper flange 500 and a rotatable lower annulus 502. Upper flange 500 is fixed to the thread portion 504, and therefore rotates in unison with the feed gear 52a. The lower annulus 502 is engaged with the rest of the cam follower by a plurality of balls 506 configured to fit tightly in ball races 508 so as to produce a ball bearing system permitting the lower annulus 502 to rotate freely in relation to the upper flange 500.

Figure 15:
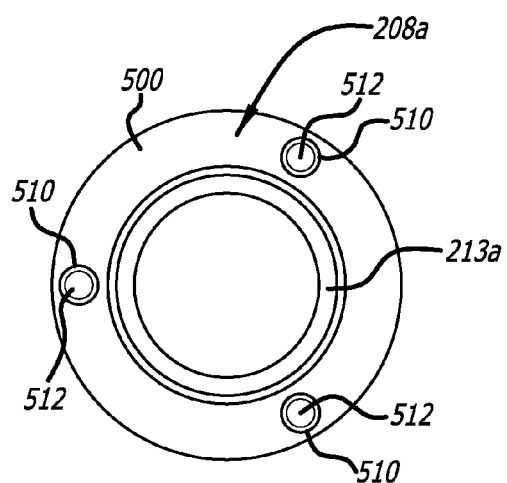
FIG. 15 is a plan view showing features of the embodiment of FIG. 14.
Figure 16:
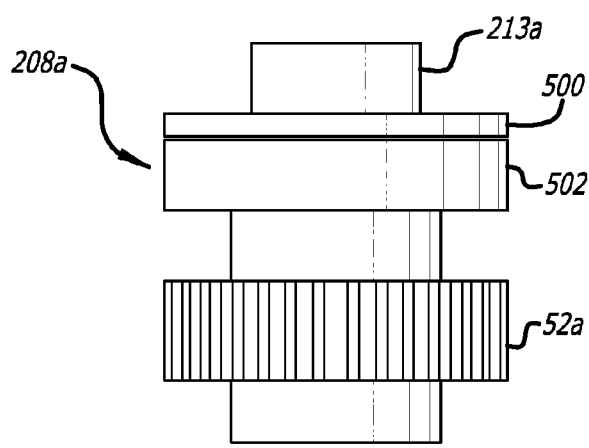
FIG. 16 is an elevational view showing features of the embodiment of FIG. 14

Next, a plurality of cylindrical openings 510 are cut into the upper flange 500, each opening sized to snugly receive a tempered steel ball 512. Each ball 512 is sized, in relation to the thickness "t" (FIG. 14) of the upper flange 500, to have a diameter that allows a small portion of the ball to protrude from both the top and bottom of the flange 500, as exemplified in FIG. 14. The number of balls to be embedded in the upper flange will match the number of undulations in the lower surface of the cam plate 206a, and will be separated by the same angular separation as the undulation wavelength in the cam plate. FIG. 15 shows a plan view looking down onto the cam follower 208a, with balls 512 embedded within the upper flange 500, specifically the balls are situated in cylindrical openings 510 machined into the upper flange. FIG. 16 is an elevational view of the structure shown in FIG. 14, however with the cam plate 206a and the bearing 200a removed for clarity.

Thus, when the feed gear 52a is rotated under power, as described above, the upper flange 500 (with embedded balls 512) rotates in unison with the feed gear 52a. The portion of each ball that protrudes upwardly from the upper face of the flange 500 will engage with the undulations of the cam plate 206a, and by following those undulations will cause the feed gear to oscillate along its rotational axis according to the principles described above. Significantly, each ball is supported in an axial direction from below by the lower annulus 502 which is free to rotate, thereby allowing the balls 512 to rotate without causing any shear force against any of their supporting surfaces. Indeed, it will be appreciated that the balls need not even come into contact with the vertical sides of the cylindrical openings 510 in the upper flange 500, because the net horizontal force on the balls will be effectively zero, as the upper horizontal drag vector on each ball will be matched by a lower horizontal drag vector in the opposite direction of equal magnitude, allowing the balls to rotate freely without experiencing a net horizontal drag. This feature of the invention provides a considerable advantage in that it does not employ a stationary undulation on the upper surface of the cam follower 208a, so that the resulting configuration has an overall frictional drag between the cam plate and the cam follower that is substantially lower than in the previous embodiments. In the instant embodiment, the balls 512 rotate rather than slide, thus substantially reducing frictional effects such as heat generation, and frictional wear and tear.

Figure 17:
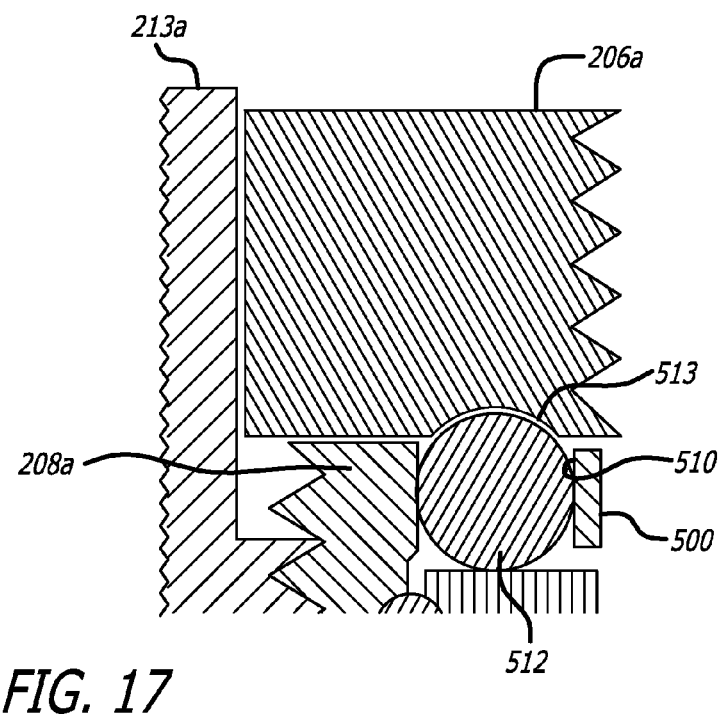
FIG. 17 is a detail view of an aspect of FIG. 14.

Finally, in a further aspect of this embodiment, exemplified clearly in FIG. 17, the undulating lower surface of the cam plate 206a may be provided with a channel 513 that follows the undulating profile previously described, the channel being configured to receive a top portion of each ball 512 that is in contact with the lower surface of the cam plate. This aspect of the invention has the advantage of reducing the localized pressure between the balls 512 and the lower surface of the cam plate by providing a larger surface area in contact.

This embodiment, although described to provide the steel balls 512 as embedded in the cam follower 208a, may equally provide the steel balls embedded in the stationary cam plate 206a, with a freely rotating annulus provided to restrain axial movement of the balls above the cam plate, and, by corollary, providing an undulating surface on the cam follower. The scope of the invention is accordingly not limited to the embodiment described, but may include an inverted combination thereof.

It will be appreciated that the solution of this embodiment has considerable flexibility. Should any of the balls 512 become damaged or lose spherical configuration, they may simply be replaced. Should the cam plate 206a become damaged, it may be removed and replaced. Should the cam follower 208a become damaged, it may be replaced. Within the cam follower, the lower annulus 502 may be replaced without replacing the entire cam follower. This flexibility provides great versatility and economy to the drilling solution. Although the various parts of the drill described may wear out and require frequent replacement, the advantage that it provides in cutting into materials is great, and readily justifies the added cost of fitting a drill with such solution.

Thus, it will be appreciated that the above described preferred embodiments have the advantages of providing a positive feed drill system with the ability to break chips up into manageable lengths, to be easily serviceable, and to be simple and inexpensive to manufacture.

While a particular form of the invention has been illustrated and described, it will also be apparent to those skilled in the art that various modifications can be made without departing from the spirit and scope of the invention. Accordingly, it is not intended that the invention be limited except by the appended claims.

I claim:

1. A drilling machine, comprising:
    a first gear with a first axis of rotation, and having a cam follower rotationally fixed to the first gear;
    a second gear with a second axis of rotation coincident with the first axis of rotation;

a housing configured to support the first gear and the second gear, the housing having a cam plate fixed to the housing; and a tool holder spindle with a third axis of rotation;

wherein, the first and second gears are configured to impart both a linear feed and a rotation to the spindle, the first and second axes of rotation being coincident with the third axis of rotation, and wherein the cam follower is adjacent the cam plate;

a plurality of steel balls partially embedded in either one of the cam plate or the cam follower, the steel balls being free to rotate; and an undulating surface on the other one of the cam plate or the cam follower, the undulating surface being in contact with the steel balls and being configured such that, when the first gear rotates to impart a linear feed to the spindle, the first gear is caused repeatedly to retract and then to advance.

2. The drilling machine of claim 1 wherein the undulating surface is in contact with a first point on each of the steel balls, and the drilling machine further includes an annulus positioned to be in contact with a second point on each of the steel balls diametrically opposite the first point, the annulus being free to rotate about the spindle axis independently of the cam follower.

3. The drilling machine of claim 2, wherein the annulus is mounted on ball bearings, the ball bearings being mounted on a portion of the cam follower.

4. The drilling machine of claim 3, wherein the annulus is immovable axially in relation to the first gear, and is configured to prevent movement of the steel balls axially in relation to the first gear.

5. The drilling machine of claim 1, wherein the undulating surface defines a channel shaped to have an arc of a circumference adapted to receive a portion of each of the steel balls, whereby contact pressure between each steel ball and the undulating surface is reduced.

6. The drilling machine of claim 1, further comprising a spring for urging the steel balls into contact with the cam plate.

7. The drilling machine of claim 1, wherein the first and second gears are configured to impart an advancing first displacement to the spindle by linear feed for each revolution of the spindle, and wherein when the first gear rotates the first gear is caused to repeatedly retract by a second displacement before advancing, the second displacement being substantially the same as the first displacement.

8. The drilling machine of claim 1, wherein the cam follower is removably attached to the first gear by a set of threads that are counter-threaded.

9. The drilling machine of claim 1, wherein the housing includes a holder plate removably attached to the housing, the holder plate being configured to removably hold the cam plate.

10. The drilling machine of claim 9, wherein the cam plate is configured to be threadably screwed into an orifice in the holder plate.

11. The drilling machine of claim 1, wherein the housing is configured to hold the cam plate a fixed distance from the cam follower, the distance being capable of being adjusted.

12. A drilling machine, comprising:

a first gear with a first axis of rotation;

an annular cam follower rotationally fixed to the first gear;

a second gear with a second axis of rotation coaxial with the first axis of rotation;

a housing configured to support the first gear and the second gear;

a holder plate removably attached to an external surface of the housing;

a cam plate removably attached to the holder plate, wherein, the cam follower is positioned to rotate adjacent the cam plate; and the holder plate defines a cylindrical bore configured to receive the annular cam follower;

a tool holder spindle extending coaxially with the first and second axes;

wherein the first and second gears are configured to impart both a linear feed and a rotation to the spindle by which, when the first and second gears rotate, the spindle simultaneously rotates and axially advances through the first gear and the second gear along the first and second axes, whereby, a single rotation of the spindle causes the spindle to advance through the first and second gears by a first axial displacement, and further;

a plurality of steel balls partially embedded in either one of the cam plate or the cam follower, the steel balls being free to rotate;

an undulating surface on the other one of the cam plate or the cam follower, the undulating surface being in contact with the steel balls and being configured such that, for every single rotation that the first gear undergoes, an assembly comprising the first gear, the second gear, and the spindle advances and retracts by a second axial displacement.

13. The drilling machine of claim 12 wherein the undulating surface is in contact with a first point on each of the steel balls, and the drilling machine further includes an annulus positioned to be in contact with a second point on each of the steel balls diametrically opposite the first point, the annulus being free to rotate about the spindle axis independently of the cam follower.

14. The drilling machine of claim 13, wherein the annulus is mounted on ball bearings, the ball bearings being mounted on a portion of the cam follower.

15. The drilling machine of claim 14, wherein the annulus is immovable axially in relation to the first gear, and is configured to prevent movement of the steel balls axially in relation to the first gear.

16. The drilling machine of claim 12, wherein the undulating surface defines a channel shaped to have an arc of a circumference adapted to receive a portion of each of the steel balls, whereby contact pressure between each steel ball and the undulating surface is reduced.

17. The drilling machine of claim 12, further comprising a spring for urging the steel balls into contact with the cam plate.

18. The drilling machine of claim 12, wherein the cam follower is removably attached to the first gear by a set of threads that are counter-threaded.

19. The drilling machine of claim 12, wherein the cam plate is configured to be threadably screwed into an orifice in the holder plate.

20. The drilling machine of claim 12, wherein the second displacement is substantially the same as the first displacement.

* * * * *